United States Patent [19]
Herbenar et al.

[11] 3,801,207
[45] Apr. 2, 1974

[54] FAIL-SAFE TURNBUCKLE

[75] Inventors: Edward J. Herbenar, Detroit; Louis E. Calvin, Warren, both of Mich.

[73] Assignee: TRW Inc., Cleveland, Ohio

[22] Filed: Feb. 10, 1972

[21] Appl. No.: 225,185

[52] U.S. Cl. .................................. 403/46, 29/175 R
[51] Int. Cl. ............................................. F16b 7/06
[58] Field of Search ....... 287/60; 29/175 R; 254/67; 403/43, 44, 45, 46

[56] References Cited
UNITED STATES PATENTS

| | | | |
|---|---|---|---|
| 236,723 | 1/1881 | Sellers | 287/60 X |
| 579,334 | 3/1897 | Williams | 287/60 |
| 2,703,723 | 3/1955 | Hess | 287/60 |
| 2,696,397 | 12/1954 | Booth | 287/60 |
| 3,065,006 | 11/1962 | Sherburne | 287/60 |

*Primary Examiner*—Andrew V. Kundrat
*Attorney, Agent, or Firm*—Hill, Sherman, Meroni, Gross & Simpson

[57] ABSTRACT

An automotive steering linkage turnbuckle formed of a rolled metal sheet having side projections to form abutment surfaces providing split ends to the formed turnbuckle sleeve with a central opening intermediate the projections, the turnbuckle having a bulged central portion of increased diameter, the threads, of opposite hand from either end, running out gradually as the inner diameter of the turnbuckle increases to provide a fracture point at the last full-depth thread so that in case of failure of the turnbuckle, separation of the elements will not occur.

4 Claims, 8 Drawing Figures

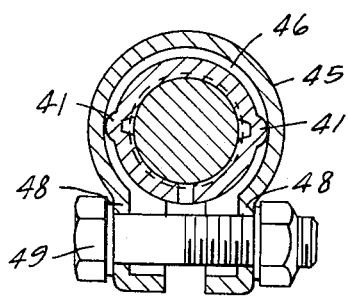
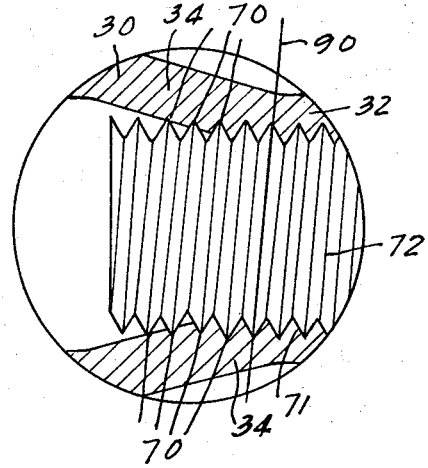
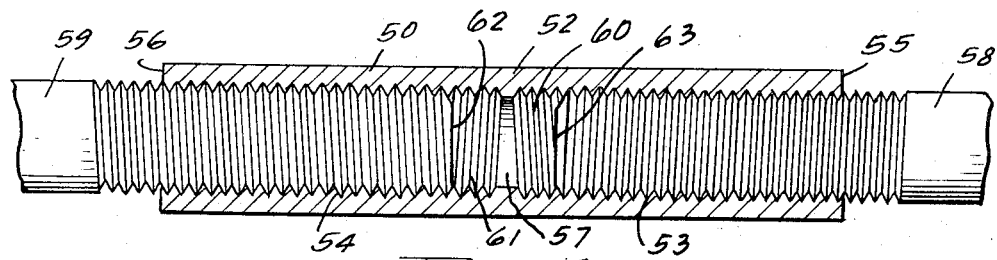
Fig-7 (PRIOR ART)
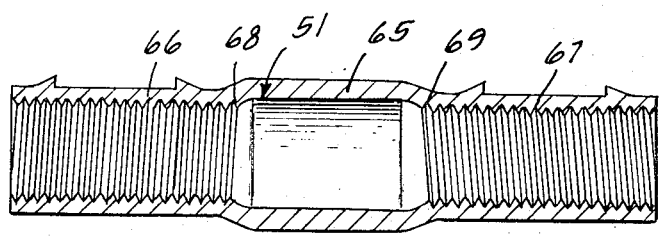
Fig-8 (PRIOR ART)

FAIL-SAFE TURNBUCKLE

BACKGROUND OF THE INVENTION

1. Field of the Invention

This invention relates to turnbuckles, more particularly to a fail-safe automotive steering linkage turnbuckle.

2. Prior Art

Automotive steering linkages generally incorporate tie rods which extend from the steering knuckle attached to the dirigible wheels of the vehicle to a steering gear moved linkage member, such as a centerlink. The tie rods are normally composed of two members connected together through a turnbuckle sleeve in a manner such that rotation of the turnbuckle sleeve around the two members will move the free ends of the two members either closer together or further apart. In this manner, the parallelism or "toe" of the dirigible wheels can be adjusted.

Normal steering linkage turnbuckle sleeves consist primarily of cylindrical tubes with female threads of opposite hand extending inwardly from either end thereof. The tie rod members are then threaded into the opposed ends of the cylindrical tube and rotation of the tube about the male threaded ends of the tie rod members will result in adjustment of the combined length of the tie rod.

In order to firmly affix the tie rod to the members to prevent movement between the components during operation of the vehicle, it has been known to split the ends of the turnbuckle sleeve and provide tightenable clamps therearound so that the sleeve can be constricted around the male threaded members to enclamp those members in a non-movable relationship with the sleeve.

Normal prior art sleeves are constructed either of tubes or of rolled sheet material. In the case of rolled sheet material, it has been common either to completely abut the entire length of the sides of the sheet or to provide a continuous gap along the length of the sheet.

Some embodiments of prior art linkages have included a sleeve having an increased diameter central section. Other embodiments have had decreased diameter central sections. In most instances, the reason for the increased or decreased diameter central sections has been to provide gripping surfaces for wrenches or the like so that they can grip the sleeve to rotate it about the male threaded members. In most instances, the female threads have stopped prior to the diameter increase of the sleeve. In those cases where the threads continue through the diameter increase, the male threaded member is not threaded to that point. See for example the U.S. Pat. to Herbenar, No. 3,583,052, issued June 8, 1971.

In most instances, and especially in those instances where there is a diameter change in the central section of the turnbuckle sleeve, the fracture point of the turnbuckle occurs at the innermost thread or the threads just past the end of the male member. This means that when the turnbuckle sleeve fractures, the male threaded components are no longer connected together, inasmuch as the male threaded components are not threaded past the fracture point. When this occurs during the operation of the vehicle, steering control is lost totally over at least one wheel.

SUMMARY

Our invention overcomes this by providing a rolled turnbuckle sleeve. The sleeve is rolled from a flat sheet or plate which has bulges on its long sides. During the rolling, the bulges abut one another when the sheet is formed to a cylinder. The abutment of the axially spaced apart abutment projections provides for a split turnbuckle which is split from either end and which is also split in between the axially spaced-apart abutment members to provide a central opening for receipt of a screwdriver or the like for turning of the sleeve. The central section of the turnbuckle has an increased diameter, the diameter increasing at an angle preferably between 10° and 25° from the constant diameter end sections. In this manner, when the sleeve is threaded with female threads from the ends, the threads naturally run out as they enter the increased diameter central portion.

Thereafter, the male threaded linkage members are threaded into the turnbuckle to a point beyond the increasing diameter portions. In this manner, each of the male threaded members is received in the sleeve with a portion of the threads extending into incompletely formed female threads. Thus, if the turnbuckle sleeve fails, a fracture point is created at the last completely formed thread and the tie rod will remain assembled together due to the interfit between the male threaded members and the incompletely formed threads beyond the fracture point.

It is therefore an object of this invention to provide a turnbuckle sleeve for steering linkage connections wherein the turnbuckle sleeve is formed of a rolled sheet.

It is another object of this invention to provide a turnbuckle sleeve for automotive steering linkages wherein the sleeve is rolled from sheet material having split ends with a central opening for receipt of a turning lever.

It is another object of this invention to provide a turnbuckle sleeve having a central bulge with female threads of opposite hand extending into the sleeve from either end thereof, and running out naturally in the area of the central bulge, leaving uncompleted threads in the transition area from the ends of the central bulge.

It is a general object of this invention to provide a fail-safe turn-buckle for automotive steering linkages.

It is a specific object of this invention to provide a turnbuckle for automotive steering linkages, the turnbuckle including a sleeve having a bulged area with internal threads having uncompleted portions in the transition area to the bulged area, and male threaded members being threaded beyond the transition area whereby failure of the turnbuckle will occur at the last completed thread, leaving the male threaded members coupled together by the interfit between the male threads and the uncompleted threads.

It is a most specific object of this invention to provide a turnbuckle for automotive steering linkages, the turnbuckle including a turnbuckle sleeve formed of rolled sheet material, the sheet material having side portions with transversely projecting abutment lands, the abutment lands abutting together along an axial line on the circumference of the rolled sleeve, the abutment lands being axially spaced apart to provide split ends for the sleeve with a central opening intermediate the abutment lands, the sleeve having a bulged central section, the sleeve having female threads of opposite hands extending thereinto from either end thereof, the female threads running out in a transition area from the constant diameter end portions to the bulged central section, whereby incomplete thread sections are formed in the transition area, the turnbuckle having two male threaded members inserted into either end of the sleeve, the male threaded members threaded into the sleeve beyond the transition area whereby portions of the male threads will be received in the uncompleted female threads, the sleeve having a fracture line at the last complete female thread, and the sleeve having radially projecting nibs formed on the circumference thereof for aligning clamps axially on the sleeve while allowing rotation of the clamps, the clamps being positioned around the split ends.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 5 is a cross-sectional view taken along the lines V—V of FIG. 4.

FIG. 6 is a fragmentary enlarged view of the transition area between the constant diameter end sections and the bulged central section of the turnbuckle sleeve of FIG. 3.

FIGS. 7 and 8 are cross-sectional views of prior art turn-buckles and turnbuckle sleeves.

DESCRIPTION OF THE PREFERRED EMBODIMENT

Figure 1:
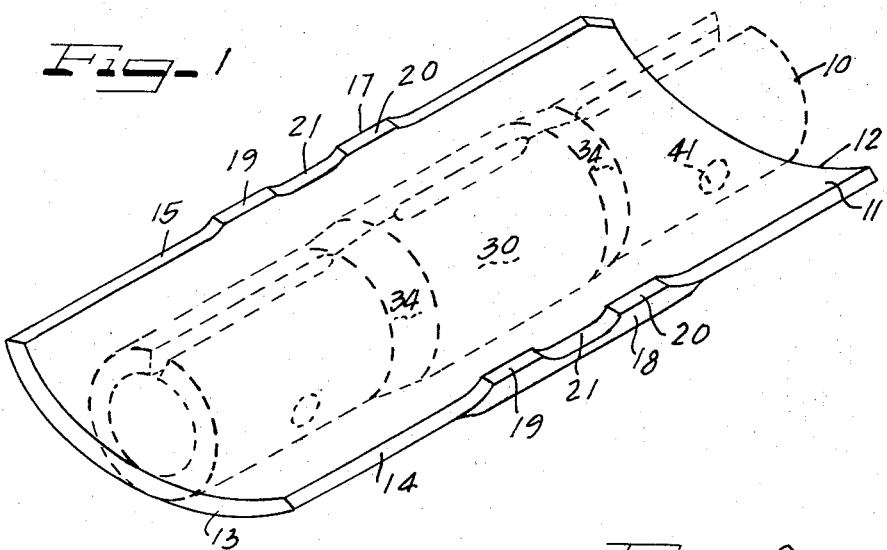
FIG. 1 is a perspective view of the turnbuckle sleeve of this invention in partially rolled and (by dotted lines) finally rolled form.

FIG. 1 illustrates a turnbuckle sleeve 10 which, according to this invention, is formed of a piece of sheet metal 11. The sheet metal 11 is rolled to form the sleeve. The sheet metal piece 11 may be considered to have end walls 12 and 13 and side walls 14 and 15.

Figure 2:
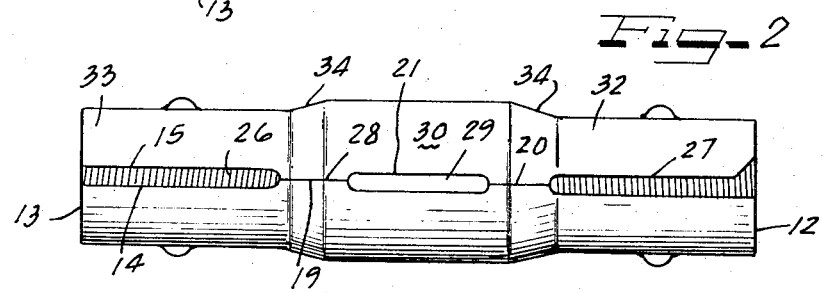
FIG. 2 is a top plan view of the sleeve of FIG. 1 in final rolled form.

Increased width projecting areas 17 and 18 are positioned intermediate the end walls 12 and 13. In this manner, the piece 11 has a central section having a greater width than the end sections. Each increased width section 17 and 18 has two abutting faces 19 and 20 thereon, spaced apart by a notched area 21. When the sheet metal 11 is rolled to the final form illustrated by the broken lines in FIG. 1 and illustrated in FIG. 2, the abutment walls 19 and 20 will abut the corresponding walls of the opposed side 14 or 15 of the plate. This will provide a turnbuckle sleeve having splits 26 and 27 at either end 12 and 13 of the sleeve, the splits extending along the line of abutment 28, the splits being formed between the now-spaced-apart walls 14 and 15. The notches 21 will form a center opening 29 intermediate the abutted-together abutment walls 19 and 20.

The wider central portions 17 and 18 further have a width sufficiently greater than the end portions to provide a bulged central section in the rolled sleeve. The bulged section begins adjacent the abutment walls 19 and 20 at the ends of the splits 26 and 27. The bulged central section 30 has both an increased inner and outer diameter, the increase being gradual from the constant diameter end portions 32 and 33 through a transition zone 34 at each end of the bulged section 30.

In the preferred embodiment, this transition area extends outwardly from the constant-diameter end sections 32 and 33 at an angle of approximately 10° to 25°, for reasons hereinafter pointed out. During the formation of the sleeve 10, prior to the rolling thereof, a plurality of stakes or depressions 40 are formed into the surface which will be the inner diameter of the sleeve. These depressions result in protuberances 41 projecting from the surface which will be the outer diameter.

Figure 4:
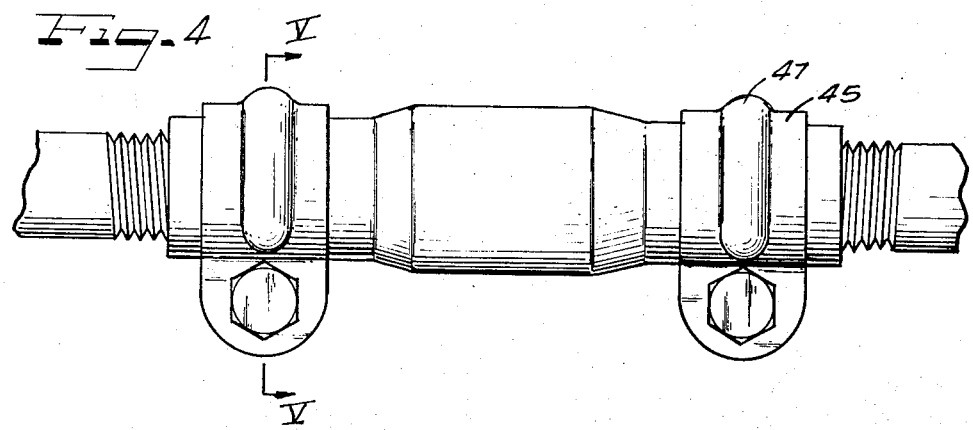
FIG. 4 is a plan view similar to FIG. 3 illustrating the turn-buckle as assembled.

The protuberances 41 are aligned with one another so that there will be two sets of protuberances, each set comprising at least two protuberances approximately diametrically opposed from one another in an area surrounding the splits 26 and 27. The protuberances become alignment points for clamps 45, illustrated in FIGS. 4 and 5. The clamps are normal C clamps having a central channel 46 formed by a circumferential bulge portion 47. The clamps have flange portions 48 which receive a bolt 49 for tightening to reduce the inner diameter of the clamp in a normal manner. By choosing a clamp having a normal inner diameter in the non-bulged area less than the space between the surfaces of the opposed bulges or protuberances 41, the clamps can be received around the protuberances with the protuberances in the channel 46. In this manner, rotation of the clamps is not eliminated, so that they may still be rotated around the sleeve to position them with the bolt 48 in the most appropriate position for tightening. At the same time, however, the sleeve and clamps can be shipped as a unit without fear of the clamps falling off. Further, it is assured that the clamps will be at the appropriate point along the length of the sleeve for greatest effectiveness in tightening the sleeve into non-rotatable relation with the male threaded members.

FIGS. 7 and 8 illustrate prior art turnbuckle sleeves 50 and 51. The sleeve 50 illustrated in FIG. 7 consists of a cylindrical tube 52 having threads 53 and 54 of opposite hands extending into the tube from the axial ends 55 and 56 thereof. The thread is terminated in spaced relation, leaving an unthreaded central area 57 and the male members 58 and 59 were threaded into the ends of the sleeve 50 terminating in spaced relation. Because of the termination of the threads and the unthreaded area 57, it was impossible to abut the male threaded members together and generally a thread section 60 and 61 existed for each of the threads 53 and 54 beyond the ends 62 and 63 of the male threaded members. Thus, when a bending stress was applied to the sleeve, fracture could occur in between the male threaded members. The point of fracture was generally along one of the thread spirals in the areas 60, 61 beyond the male threaded members. This would result in complete failure of the turnbuckle and separation of the male threaded members 58 and 59. When this occurs in the steering linkage of a vehicle, control over the associated wheel is lost.

The sleeve 51 illustrated in FIG. 8 differed from the sleeve 50 in that it had a central bulged area 65 having a larger inner diameter than the threaded areas 66 and 67 associated with opposed ends. Normally, the threaded areas 66 and 67 terminated in full depth threads 68 and 69 adjacent the bulged area 65. In these cases, the male threaded members could not be abutted together inasmuch as the threads did not run out in the bulged areas and therefore the male threaded members could not be threaded past the final thread section 68, 69, Because of this, fracture would occur generally at the final threads 68, 69 which provided a weak point in the sytem. If fracture occurred at these points, again complete separation of the components occurred.

Our invention overcomes this problem by providing for a run-out of the threads in the central bulge area through a transition zone 34 which includes incompletely formed thread sections.

This is best illustrated in FIG. 6, which shows the transition zone 34 which projects outwardly from the constant diameter section 32 or 33 at an angle of approximately 10° to 25°, and terminates in the full bulged central section 30. The transition section 34 includes thread portions 70 which are incompletely formed.

During the formation of the threads 71, the thread forming tool passes into the central bulge area through the transition area where the complete crowns or inner diameter portions of the thread sections 70 are not formed. However, a sufficient portion of the thread is formed in the transiion area to provide an interfit between the male thread 72 and the incompletely formed thread portion 70.

Figure 3:
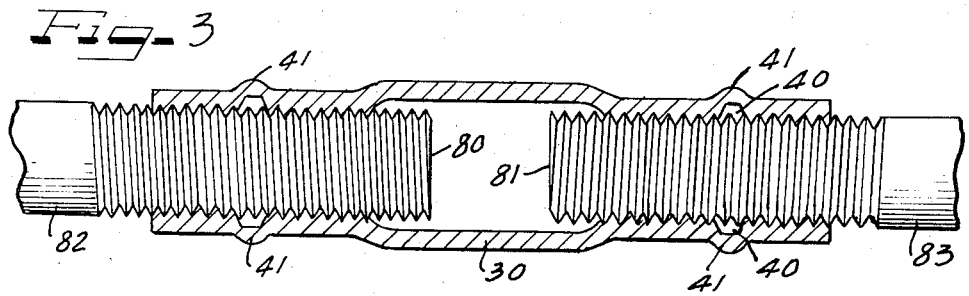
FIG. 3 is a fragmentary cross-sectional view of the turnbuckle of this invention with the sleeve in cross-section.

In our invention, the male threaded members are threaded beyond the transition zone into the bulged central area. This is illustrated in FIG. 3. It is possible to abut together the ends 80 and 81 of the male threaded members 82 and 83 in the central bulged section 30 to provide full adjustment of the turnbuckle assembly with minimum sleeve length. Because the male threaded members extend through the partially formed threads of the transition zone, there are always portions of the male thread received in the incompletely formed threaded portion 70.

Tests of prior art turnbuckle assemblies such as those illustrated in FIGS. 7 and 8 have shown that failure will always occur with excessive loads at the tubular thread which is in line with the free end of the male threaded stem. The stress riser caused by the thread in the tube extending past the end of the male stem causes failure at the point of final projection of the male threaded member into the female threaded section.

In our embodiment illustrated best in FIGS. 3 and 6, because the male threaded member extends beyond the ends of the female threads, the stress riser caused by loading of the thread in the sleeve is eliminated. Tests have shown that this construction will fail at the last full thread just prior to the transition section. This point of failure is illustrated by the line 90 in FIG. 6. The remaining partial threads 70 are sufficient to hold the assembly together, preventing separation of the elements. This provides a fail-safe feature to our turnbuckle.

By angling the transition zone from 10° to 25° from the axis the gradual runout of the thread is assured.

Additional advantages to the disclosed turnbuckle lie in the fact that it can be economically produced from sheet material and that the resultant turnbuckle assembly is superior from a quality standpoint. Because the expanded central section allows relief for the tapping tool, the manufacturing quality of the threads formed in this sleeve have been found to be superior. Better threads provide for better clamping with less bolt torque, thereby increasing the assembleability and adjustability of the turnbuckle system.

It will therefore be seen from the above that our invention provides a turnbuckle assembly having a novel turnbuckle sleeve which is formed from rolled sheet material with a central increased inner diameter bulged area integral with constant diameter end portions through transition zones formed of the same material as the bulge section and end portions. Female threads, of opposite hand from either end of the sleeve, extend into the transiton zones forming incomplete thread sections in the transition zones. The male threaded members are threaded beyond the transition zone into the central bulge area, whereby a portion of the male threads will be received in the incomplete thread sections, thus providing a fracture line at the last complete thread section whereby failure of the sleeve will not result in separation of the components of the turnbuckle.

Our preferred turnbuckle includes a central slit opening for receipt of a turning tool and radially projecting protuberances on the outer diameter for aligning tightening clamps, the protuberances received in a channel in the clamp.

Although the teachings of our invention have herein been discussed with reference to specific theories and embodiments and although illustrative means for accomplishing explained results have been described, it is to be understood that these are by way of illustration only and that others may wish to utilize our invention in different designs or applications.

We claim as our invention:

1. A turnbuckle assembly comprising a longitudinally elongated, longitudinally split turnbuckle sleeve with internal female threads of opposite hand extending into the sleeve from both ends thereof, said sleeve having an increased diameter central section and smaller diameter end sections merged into the central section along gradually sloping transition zones, the longitudinal walls of the sleeve on each side of the split being abutted together at said transition zones and spaced apart along the lengths of said end sections and the central portion of said central section to provide a central longitudinal slot closed at both ends in the central section and gaps along the length of the end sections opening through the outer ends of said end sections, said transition zones each having an inner diameter varying from less than the major diameter of the female threads to a diameter greater than the major diameter of said female threads, the female threads continuing into said transition zones and running out therein to provide partially formed female threads on the inner diameter of each transition zone, and male threaded members threaded into both ends of the sleeve beyond said transition zones with some of the male threads threaded into the partially formed female threads.

2. The assembly of claim 1 wherein each transition zone slopes outwardly from the end section to the central section at an angle of about 10° to 25° to the axis of the sleeve.

3. The assembly of claim 1 wherein the sleeve has external protuberances projecting radially therefrom and positioned in each end section and circumferentially spaced from the gap of the end section, and clamp members encircling the end sections having means interfitting with said protuberances to restrict axial movement of the clamp members on the sleeve.

4. The assembly of claim 3 including at least two circumferentially spaced protuberances on each end section and wherein said means on the clamp members allow rotation of the clamp members on the sleeve.

* * * * *